United States Patent
Spina et al.

(10) Patent No.: US 11,807,128 B2
(45) Date of Patent: Nov. 7, 2023

(54) BRAND IDENTIFICATION WHILE RECHARGING AN ELECTRIC VEHICLE

(71) Applicant: GM GLOBAL TECHNOLOGY OPERATIONS LLC, Detroit, MI (US)

(72) Inventors: Richard C. Spina, Bloomfield Hills, MI (US); Vyacheslav Berezin, Newmarket (CA); Hannah Nissenbaum, Toronto (CA)

(73) Assignee: GM Global Technology Operations LLC, Detroit, MI (US)

( * ) Notice: Subject to any disclaimer, the term of this patent is extended or adjusted under 35 U.S.C. 154(b) by 180 days.

(21) Appl. No.: 17/496,293

(22) Filed: Oct. 7, 2021

(65) Prior Publication Data

US 2023/0122692 A1 Apr. 20, 2023

(51) Int. Cl.
| | |
|---|---|
| B60L 53/66 | (2019.01) |
| H02J 7/00 | (2006.01) |
| B60L 53/16 | (2019.01) |
| B60L 53/30 | (2019.01) |
| G06Q 50/30 | (2012.01) |

(52) U.S. Cl.
CPC .............. *B60L 53/66* (2019.02); *B60L 53/16* (2019.02); *B60L 53/305* (2019.02); *H02J 7/00032* (2020.01); *H02J 7/0042* (2013.01); *H02J 7/00711* (2020.01); *G06Q 50/30* (2013.01)

(58) Field of Classification Search
CPC ........ B60L 53/66; B60L 53/305; H02J 7/0042
USPC ......................................................... 320/109
See application file for complete search history.

(56) References Cited

U.S. PATENT DOCUMENTS

| | | | | |
|---|---|---|---|---|
| 9,118,183 | B2 * | 8/2015 | Erger | H02J 7/00 |
| 9,296,307 | B2 * | 3/2016 | Nosaka | B60L 53/66 |
| 11,007,892 | B2 * | 5/2021 | Metzger | B60L 53/65 |
| 2013/0085696 | A1 * | 4/2013 | Xu | G06F 17/40 |
| | | | | 702/63 |
| 2014/0159659 | A1 * | 6/2014 | Nosaka | B60L 53/16 |
| | | | | 320/109 |
| 2015/0123610 | A1 * | 5/2015 | Zaki | B60L 58/10 |
| | | | | 320/109 |
| 2018/0339597 | A1 * | 11/2018 | Kruszelnicki | B60L 53/305 |
| 2018/0339601 | A1 * | 11/2018 | Kruszelnicki | B60L 53/16 |
| 2019/0259225 | A1 * | 8/2019 | Amendolagine | G07C 5/085 |

(Continued)

OTHER PUBLICATIONS

International Electrotechnical Commission (IEC), International Standard IEC 61851-1, First Edition, Jan. 2001, 11 pages, Geneva, Switzerland.

(Continued)

*Primary Examiner* — Suchin Parihar
(74) *Attorney, Agent, or Firm* — Quinn IP Law

(57) ABSTRACT

A method for brand identification of an electric vehicle to a charging station includes connecting a plug of the charging station to a socket of the electric vehicle, receiving a control pilot signal at the socket from the charging station, terminating the control pilot signal in a variable resistance in the electric vehicle, and toggling the variable resistance in a vehicle pattern that transitions between two charging state resistances. The charging station detects the vehicle pattern and maps the vehicle pattern to a vehicle brand of the electric vehicle. The method includes receiving electrical current to recharge the electric vehicle at the socket.

20 Claims, 8 Drawing Sheets

(56) References Cited

U.S. PATENT DOCUMENTS

2019/0263286 A1* 8/2019 Metzger ................ B60L 53/65
2023/0141162 A1* 5/2023 Kawashima .......... H04L 9/3226
701/22

OTHER PUBLICATIONS

SAE International, Surface Vehicle Recommended Practice, SAE Electric Vehicle and Plug in Hybrid Electric Vehicle Conductive Charge Coupler, SAE J1772, Jan. 2010, 51 pages, Warrendale, Pennsylvania.

* cited by examiner

(12) United States Patent

BRAND IDENTIFICATION WHILE RECHARGING AN ELECTRIC VEHICLE

TECHNICAL FIELD

The present disclosure relates to a system and a method for brand identification while recharging an electric vehicle.

INTRODUCTION

Electric vehicle owners are experiencing an increasing number of charging stations options from which to choose. Although most charging stations and electric vehicles comply with common charging standards, various factors sometimes make it beneficial for certain brands of electric vehicles to be recharged solely at authorized charging stations. For example, a battery pack chemistry utilized by a specific company while building a specific brand of electric vehicle may last longer if the charging station takes the battery pack chemistry into consideration. The longer lasting battery pack may allow the specific company to extend a warranty on battery packs that are properly recharged. Accordingly, those skilled in the art continue with research and development efforts in the field of brand identification during electric vehicle recharging.

SUMMARY

A method for brand identification of an electric vehicle to a charging station is provided herein. The method includes connecting a plug of the charging station to a socket of the electric vehicle, receiving a control pilot signal at the socket from the charging station, terminating the control pilot signal in a variable resistance in the electric vehicle, and toggling the variable resistance in a vehicle pattern that transitions between two charging state resistances. The charging station detects the vehicle pattern and maps the vehicle pattern to a vehicle brand of the electric vehicle. The method further includes receiving electrical current to recharge the electric vehicle at the socket.

In one or more embodiments of the method, the vehicle pattern is at least two transitions between the two charging state resistances within a vehicle time limit.

In one or more embodiments of the method, the two charging state resistances are a regular charging state resistance and a ventilation charging state resistance.

In one or more embodiments of the method, the vehicle pattern starts at the regular charging state resistance, and the ventilation charging state resistance is a lower resistance than the regular charging state resistance.

In one or more embodiments of the method, a plurality of the vehicle patterns distinguishes among a plurality of vehicle brands.

In one or more embodiments of the method, the vehicle pattern maintains an uninterrupted flow of the electrical current from the charging station to the electric vehicle.

A method for brand identification of a charging station to an electric vehicle is provided herein. The method includes connecting a plug of the charging station to a socket of the electric vehicle, generating a control pilot signal in the charging station, toggling a pulse width modulation of the control pilot signal in a station pattern that transitions between two current capacity limits, and presenting the control pilot signal in the plug to the electric vehicle. The electric vehicle detects the station pattern and maps the station pattern to a station brand of the charging station. The method further includes presenting electrical current to recharge the electric vehicle at the plug.

In one or more embodiments of the method, station pattern is at least two transitions in the pulse width modulation of the control pilot signal within a station time limit.

In one or more embodiments of the method, the two current capacity limits are a regular current capacity limit that the charging station may deliver to the electric vehicle and a different current capacity limit.

In one or more embodiments of the method, the station pattern starts at the regular current capacity limit, and the different current capacity limit is a lower current capacity limit than the regular current capacity limit.

In one or more embodiments of the method, a plurality of the station patterns distinguishes among a plurality of station brands.

In one or more embodiments of the method, the station pattern maintains an uninterrupted flow of the electrical current from the charging station to the electric vehicle.

A method for brand identification while recharging an electric vehicle is provided herein. The method includes connecting a plug of a charging station to a socket of the electric vehicle, generating a control pilot signal in the charging station, toggling a pulse width modulation of the control pilot signal in a station pattern that transitions between two current capacity limits, presenting the control pilot signal in the plug to the electric vehicle, and receiving the control pilot signal in the socket from the charging station. The electric vehicle is configured to detect the station pattern and map the station pattern to a station brand of the charging station. The method further includes terminating the control pilot signal in a variable resistance in the electric vehicle, and toggling the variable resistance in a vehicle pattern that transitions between two charging state resistances. The charging station detects the vehicle pattern and maps the vehicle pattern to a vehicle brand of the electric vehicle. The method further includes presenting electrical current to recharge the electric vehicle at the plug, and receiving the electrical current to recharge the electric vehicle at the socket.

In one or more embodiments of the method, the charging station initiates the toggling of the pulse width modulation in the station pattern, and the electric vehicle responds to the station pattern by the toggling of the variable resistance in the vehicle pattern.

In one or more embodiments of the method, the electric vehicle initiates the toggling of the variable resistance in the vehicle pattern, and the charging station responds to the vehicle pattern by the toggling of the pulse width modulation in the station pattern.

In one or more embodiments, the method includes marking the charging station as a self-brand in the electric vehicle where the station brand matches one among one or more authorized station brands.

In one or more embodiments, the method includes recording the vehicle brand in the charging station.

In one or more embodiments of the method, the toggling of the pulse width modulation occurs after an initial handshake has completed between the charging station and the electric vehicle.

In one or more embodiments of the method, the toggling of the variable resistance occurs after an initial handshake has completed between the charging station and the electric vehicle.

In one or more embodiments of the method, the control pilot signal is compliant with at least one of an SAE International J1772 standard and/or an International Electrotechnical Commission 61851-1 standard, and the two charging state resistances correspond to a state C resistance and a state D resistance.

The above features and advantages and other features and advantages of the present disclosure are readily apparent from the following detailed description of the best modes for carrying out the disclosure when taken in connection with the accompanying drawings.

DETAILED DESCRIPTION

Various embodiments of the disclosure provide a system and/or a method where a company-branded charging station may recognize a company-branded electric vehicle, and vice versa. The brand identification is accomplished utilizing and building on current charging standards. The brand identification generally includes two components, one that identifies a vehicle brand to the charging stations (or electric vehicle supply equipment), and another that identifies the charging station brand to the electric vehicle. The two components may work independently, or as a request followed by a response.

The charging station may recognize the electric vehicle in response to the electric vehicle toggling between pilot states. For example, the electric vehicle may change between a state C and a state D in a vehicle pattern (e.g., CDCDC). The toggling generally occurs during recharging with no charge interruption, as both the state C and the state D are charging states. In various embodiments, the toggling may occur after an initial connection handshake anytime during charging. In other embodiments, the toggling may occur in a predetermined window of time after the initial connection handshake.

The electric vehicle may recognize a branded charging station in response to the charging stations toggling a pulse width modulation (PWM) of a sequence of pulses presented to the electric vehicle. The charging station may indicate a change in available current levels during the recharging for a small unit of time. The toggle time is generally short enough so as not to interrupt the recharge session set-up.

The pilot state toggling and the pulse width modulation toggling, for example, may occur one-and-a-half times, two times, two-and-a-half times, three times, or additional times to signify different meanings. In some embodiments, the pilot state toggling and the pulse width modulation toggling may be configured independently and therefore the communication is fully bidirectional. In other embodiments, the two toggles may be configured unidirectionally, where a sending end requests a toggle from the receiving end. In the unidirectional cases, the second toggle may be used as a conformation or receipt, and assurance that both the sender and the receiver are branded to authorized companies. For example, the electric vehicle may initially send a toggle during each recharge, and subsequently mark a charging station as a like brand when an authorized toggle is received. In some situations, the electric vehicle would wait for the charging station to toggle first, and so the electric vehicle would not present a toggle to public chargers, or nonauthorized charging stations. The connection between like-branded electric vehicles and charging stations may be reported through communication networks to the corresponding company(s) for purposes such as marketing campaigns, battery warranty extension, hardware sales, payment for the recharge, and the like.

Figure 1:
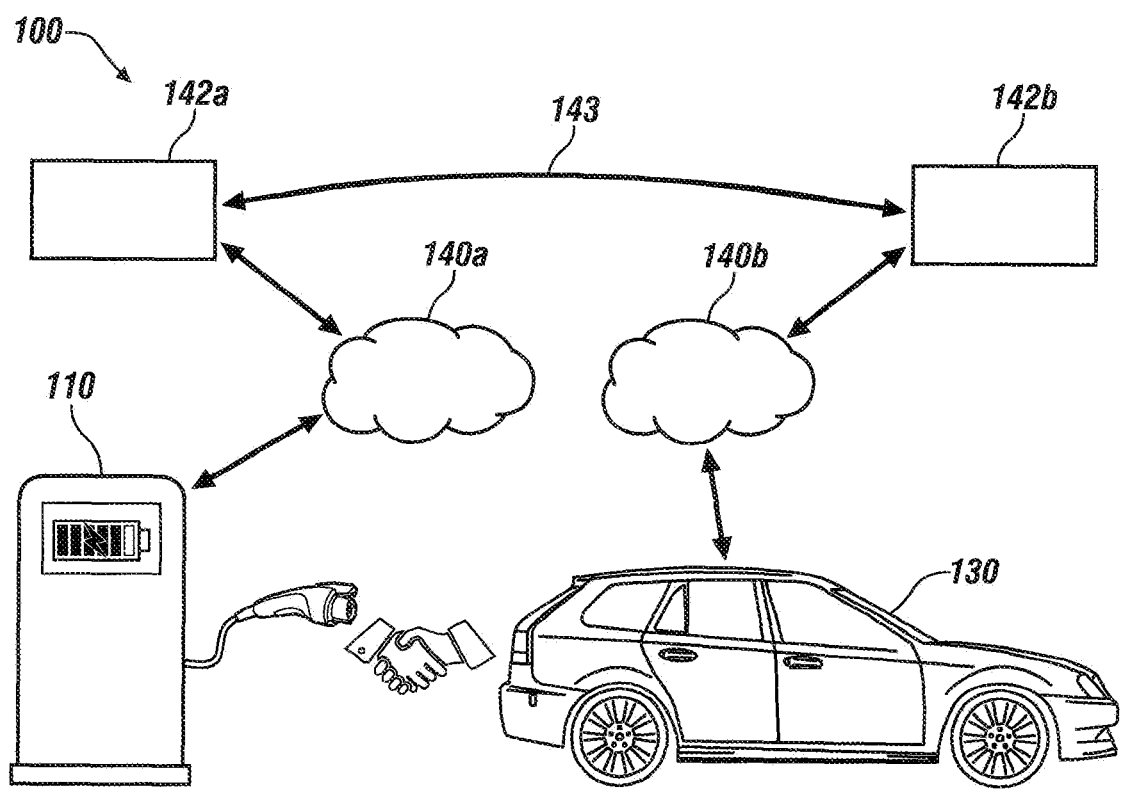
FIG. 1 is a schematic diagram of a system in accordance with one or more exemplary embodiments.

Referring to FIG. 1, a schematic diagram of an example implementation of a system 100 is shown in accordance with one or more exemplary embodiments. The system 100 generally comprises one or more charging stations 110 (one shown), one or more electric vehicles 130 (one shown), multiple communication networks 140a-140b, multiple server computers 142a-142b, and a business-to-business connection 143. The electric vehicles 130 may be connectable to the charging stations 110 to recharge batteries within the electric vehicles. In various embodiments, the electric vehicles 130 may determine a brand identification of the charging stations 110 used for the recharge. Where a charging station 110 in use is an authorized charging station, the electric vehicles 130 may report the information to the vehicle server computers 142b for marketing, warranty, and/or sales purposes. In some embodiments, the charging stations 110 may determine a brand identification of the electric vehicles 130 being recharged. The brand identifications of the electric vehicles 130 may be reported to the charger server computers 142a for marketing purposes and/or business location analysis. In various embodiments, the charging stations 110 may adjust a cost for recharging or possibly deny recharging of non-authorized brands of the electric vehicles 130. Other characteristics of the electric vehicles 130 may be reported to the charging stations 110 via the pilot state toggling, such as vehicle make, vehicle model, vehicle year, battery system brand, battery system make, battery system model, year of the battery system/electrification platform, and the like.

The charging stations 110 implement electric vehicle supply equipment (EVSE). The charging stations 110 are operational to provide electrical power (e.g., electrical current at a voltage) to the electric vehicles 130 to recharge onboard batteries of the electric vehicles 130. In various embodiments, the charging stations 110 may be compliant with the SAE International J1772 standard and/or the International Electrotechnical Commission (IEC) 61851-1 standard. The charging stations 110 may be AC Level 1, AC Level 2, DC Level 1, and/or DC Level 2 chargers. Other charging standards may be implemented to meet the design criteria of a particular application. Some charging stations 110 may be placed at fixed locations. Other charging stations 110 may be mobile, for example, mounted on a flatbed truck.

Each charging station 110 may be operational to toggle pulse width modulations (or duty cycles) of pulses in a control pilot signal in a particular station pattern. The electric vehicles 130, where equipped, may determine the station brand based on the particular station pattern. Each charging station 110 may also be operational to detect a particular vehicle pattern, where present, by monitoring a termination load that the electric vehicles 130 provide for the control pilot signal. The particular vehicle pattern informs a charging station 110 of the vehicle brand currently being recharged.

Each electric vehicle 130 implements an electric-powered vehicle, a hybrid vehicle, or a plug-in hybrid vehicle. In various embodiments, the electric vehicles 130 may be compliant with the SAE International J1772 standard and/or the International Electrotechnical Commission (IEC) 61851-1 standard. The electric vehicles 130 may implement AC Level 1, AC Level 2, DC Level 1, and/or DC Level 2 charging capabilities. Other standards may be implemented to meet the design criteria of a particular application. In various embodiments, the electric vehicles 130 may include, but are not limited to, passenger vehicles, trucks, autonomous vehicles, motorcycles, boats, and/or aircraft. In some embodiments, the electric vehicles 130 may be stationary objects such as rooms, booths and/or structures. Other types of electric vehicles 130 may be implemented to meet the design criteria of a particular application.

Each electric vehicle 130 may be operational to toggle a terminal load of the control pilot signal in a particular vehicle pattern. The charging stations 110, where equipped, may determine the vehicle brand based on the particular vehicle pattern. Each electric vehicle 130 may also be operational to detect a particular station pattern, where present, by monitoring the pulse width modulation used in the control pilot signal. The particular station pattern informs an electric vehicle 130 of the station brand currently being used for the recharge.

Each communication network 140a-140b implements a backbone network. The communication networks 140a-140b may include one or more wired networks and/or one or more wireless networks. In various embodiments, the communication networks 140a-140b may include the Internet, cellular networks, Wi-Fi networks, Ethernet network, and the like. The charger communication network 140a is generally operational to transfer data between the charging stations 110 and the charger server computers 142a. The vehicle communication network 140b is generally operational to transfer data between the electric vehicles 130 and the vehicle server computers 142b.

Each server computer 142a-142b implements a distributed collection of computers. The charger server computers 142a are generally operational to process the data received from the charging stations 110. The vehicle server computers 142b are generally operational to process the data received from the electric vehicles 130. The charger server computers 142a may communicate with the vehicle server computers 142b via the business-to-business connection 143. The data may be used by the companies to determine when and where the electric vehicles 130 are being recharged at the authorized charging stations 110. The data may also be used to determine when and where the various brands of electric vehicles 130 are being recharged by the charging stations 110. The authorized charging stations 110 may be owned and operated by a single company that also manufactures and sells the electric vehicles 130. The authorized charging stations 110 may be owned and/or operated by multiple companies that are working together.

Figure 2:
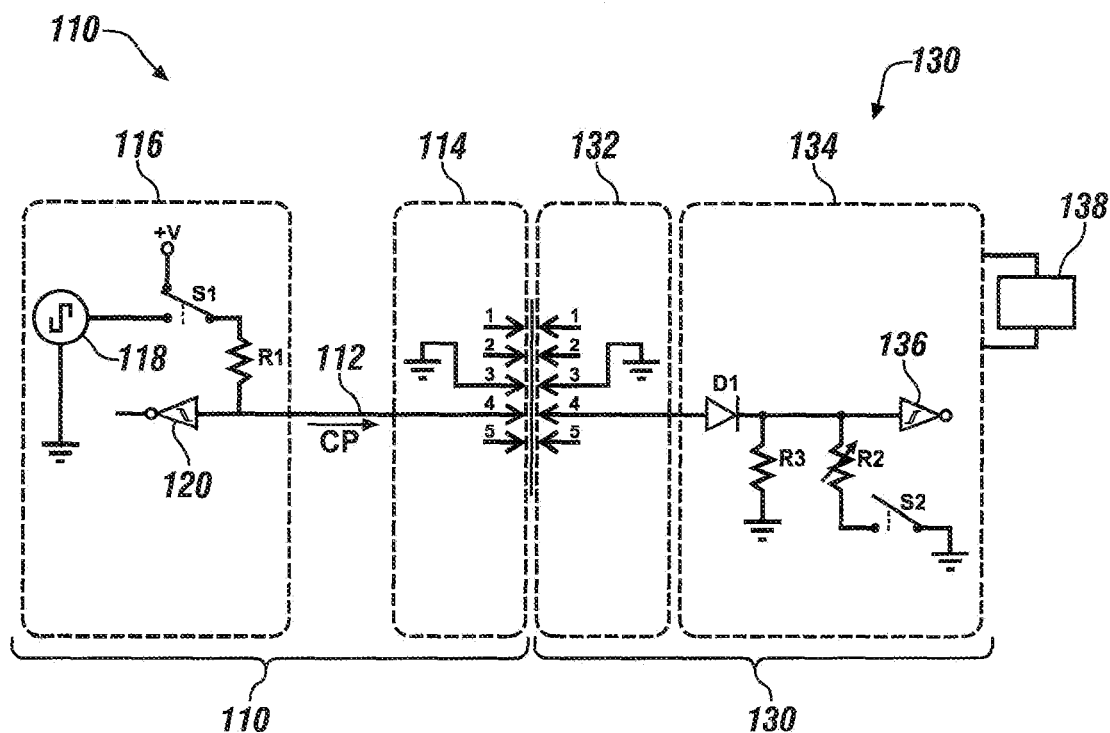
FIG. 2 is a schematic diagram of a charging station connected to an electric vehicle in accordance with one or more exemplary embodiments.

Referring to FIG. 2, a schematic diagram of an example charging station 110 connected to an electric vehicle 130 is shown in accordance with one or more exemplary embodiments. The charging stations 110 includes a cable 112, a plug 114, a station controller 116, a square wave generator 118, a station detector 120, a first switch S1, and a first resistor R1. Other components may be included within the charging station 110 to meet a design criteria of a particular application. The electric vehicle 130 includes a socket 132, a vehicle controller 134, a vehicle detector 136, one or more battery packs 138, a diode D1, a variable second resistor R2, a third resistor R3, and a second switch S2. Other components may be included within the electric vehicle 130 to meet a design criteria of a particular application.

A control pilot signal (CP) may be generated by the station controller 116 and transferred through the cable 112, the plug 114, and the socket 132 to the vehicle controller 134. The control pilot signal conveys a sequence of square waves generated by the square wave generator 118. The station controller 116 may change the duty cycle of the square waves to send data to the vehicle controller 134. The vehicle controller 134 may change a termination resistance for the control pilot signal to send data back to the station controller 116.

In the absence of the electric vehicle 130, a voltage +V (e.g., approximately +12 volts) may be sensed by the station detector 120 thereby indicating a standby status (or state A). When the plug 114 of the electric vehicle 130 is connected to the socket 132 of the charging station 110, the first switch S1 may transfer the voltage +V through the first resistor R1, the diode D1, and the third resistor R3 to ground. A voltage drop (e.g., from +12 volts to +9 volts) caused by the first resistor R1, the diode D1 and the third resistor R3 may be sensed by the station detector 120 and the vehicle detector 136 to indicate that the electric vehicle 130 has been detected (or state B).

Once the electric vehicle 130 has been detected (e.g., a substate B1), the charging station 110 may toggle the first switch S1 to generate the control pilot signal from the square wave generator 118 (e.g., a substate B2). The square wave generator 118 creates a square wave with an amplitude of approximately ±V (e.g., ±12 volts) and a frequency of approximately 1,000 hertz. A duty cycle of the square wave generally informs the electric vehicle 130 of a continuous current that the charging station 110 can deliver the electric vehicle 130. For example, a duty cycle (or pulse width modulation) of 10% signals a 6-amperes (A) continuous current capacity limit. A duty cycle of 50% indicates a 30-amperes continuous current capacity limit. Other current capacity limits and/or number of AC phases may be implemented to meet a design criteria of a particular application.

To begin a recharge, the vehicle controller 134 may close the second switch S2 to connect the second variable resistor R2 in parallel with the third resistor R3. The variable second resistor R2 drops the voltage of the control pilot signal further (e.g., from +9 volts to +6 volts) to signify that the electric vehicle 130 is in a ready condition (or state C) to receive electric power. The resistance that corresponds to the state C condition may be referred to as a regular charging state resistance. The vehicle controller 134 may change the resistance of the variable second resistor R2 to lower the voltage on the control pilot signal CP further (e.g., to +3 volts) to signify a ready-with-ventilation condition (or state D). The resistance that corresponds to the state D condition may be referred to as a ventilation charging state resistance. The charging station 110 may switch on a ventilation system (not shown) while in the ready-with-ventilation condition. Alternatively, the vehicle controller 134 may initially change from the state B to the state D and subsequently toggle between the state D and the state C. While in either the ready state C or the ventilation state D, the charging station 110 presents electrical power in the plug 114 to recharge the battery pack 138 in the electric vehicle 130. No voltage present on the control pilot signal generally indicates no electrical power is present (or state D). An out-of-range voltage on the control pilot signal indicates an error condition (or state E).

Figure 3:
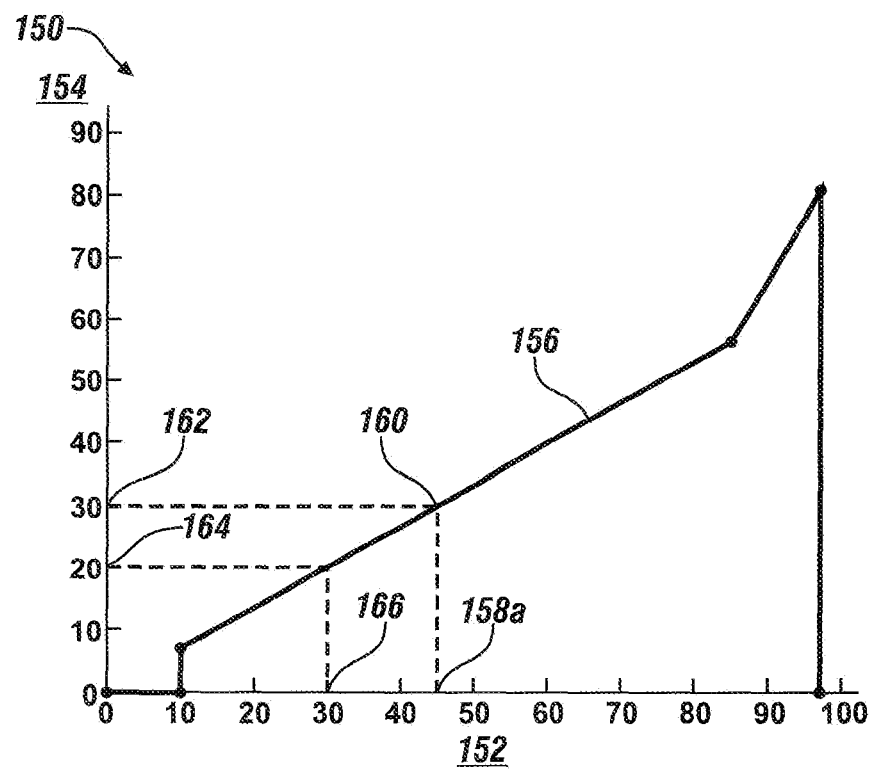
FIG. 3 is a graph of a charging current as a function of a control pilot signal in accordance with one or more exemplary embodiments.

Referring to FIG. 3, a graph 150 of an example relationship between the control pilot signal duty cycle and the charging current is shown in accordance with one or more exemplary embodiments. An X axis 152 of the graph 150 generally indicates the duty cycle in percentage. A Y axis 154 of the graph 150 indicates the constant charging current in amperes. A curve 156 shows the relationship between the duty cycle and the constant charging current.

The curve 156 shows that for a duty cycle of less than 10 percent, no charging current is available from the charging station 110. At the 10 percent duty cycle, the charging station 110 may deliver up to 6 amperes of constant current. Between the 10 percent duty cycle and an 85 percent duty cycle, the charging station 110 may provide additional charging current per equation 1 as follows:

$$\text{Charging current}=(\text{percent duty cycle}) \times 0.6A \qquad (1)$$

Above the 85 percent, the charging current may be determined by equation 2 as follows:

$$\text{Charing current}=(\text{percent duty cycle}-64\%) \times 2.5A \qquad (2)$$

A pulse width modulation above 90 percent flags a fast charge operation.

By way of example, the charging station 110 may generate the control pilot signal with a first regular duty cycle 158a of 45 percent. The first regular duty cycle 158a established an operating point 160 along the curve 156. The operating point 160 informs the electric vehicle 130 that a regular current capacity limit 162 that the charging station 110 provides is a 30-amperes limit. A different current capacity limit 164 that corresponds to a different duty cycle 166, may be a greater current capacity limit or a lower current capacity limit (as shown) than the regular current capacity limit 162.

Figure 4:
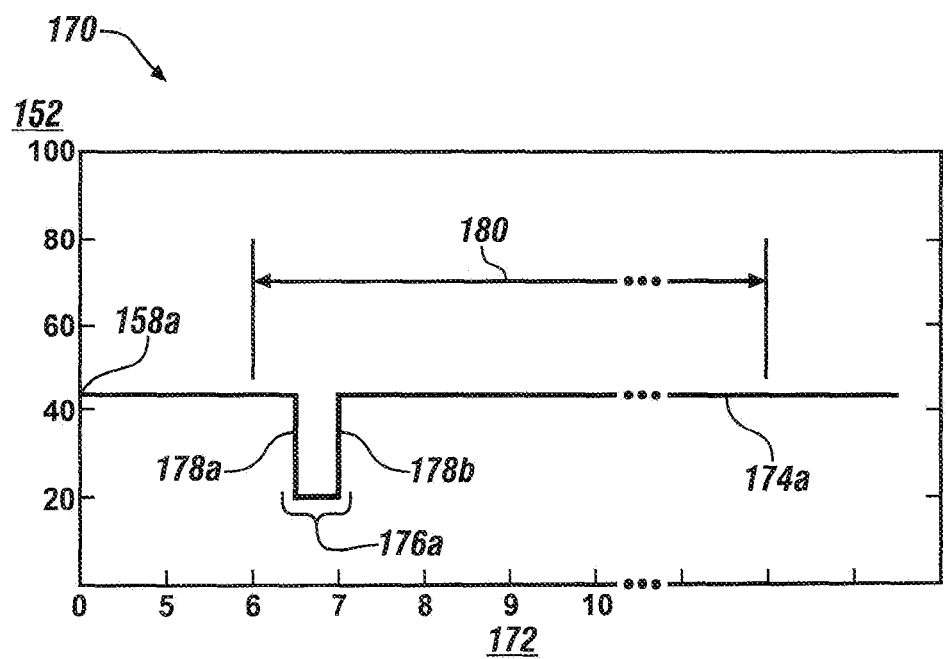
FIG. 4 is a graph of a first station pattern in accordance with one or more exemplary embodiments.

Referring to FIG. 4, a graph 170 of an example first station pattern is shown in accordance with one or more exemplary embodiments. The first station pattern illustrates two toggles down. An X axis 172 of the graph 170 shows time in units of second. A Y axis 152 of the graph 170 shows the duty cycle in units of percentage. A first pulse width modulation curve 174a illustrates the duty cycle as a function of time.

The example illustrates the duty cycle starting at the first regular duty cycle 158a of 45 percent. After the initial handshake has been established between the charging station 110 and the electric vehicle 130, the charging station 110 may modify the duty cycle in the control pilot signal. The duty cycle modification generally involves at least two transitions between two different duty cycles. For example, at 2.5 second the first pulse width modulation curve 174a may experience a first transition 178a from the 45 percent duty cycle to a lower (e.g., half power, or about 20 percent) duty cycle. The first pulse width modulation curve 174a may transition back to the 45 percent duty cycle (e.g., a second transition 178b). The transitions 178a-178b may form a first station pattern 176a. The charging station 110 generally completes the first station pattern 176a within a station time limit 180. The station time limit 180 is sufficiently short so as not to end the recharging session. Since both the 45 percent duty cycle and the 20 percent duty cycle translate to charging currents above the 6 amperes minimum limit, recharging of the electric vehicle 130 is maintained during the first station pattern 176a. The electric vehicle 130 interprets the first station pattern 176a as that of a particular charging station. The particular charging station may be among one or more authorized charging stations or unauthorized charging stations. While the first station pattern 176a may involve as few as two transitions, implementing at least three transitions generally reduces a probability that random noise may be interpreted as a station pattern.

Figure 5:
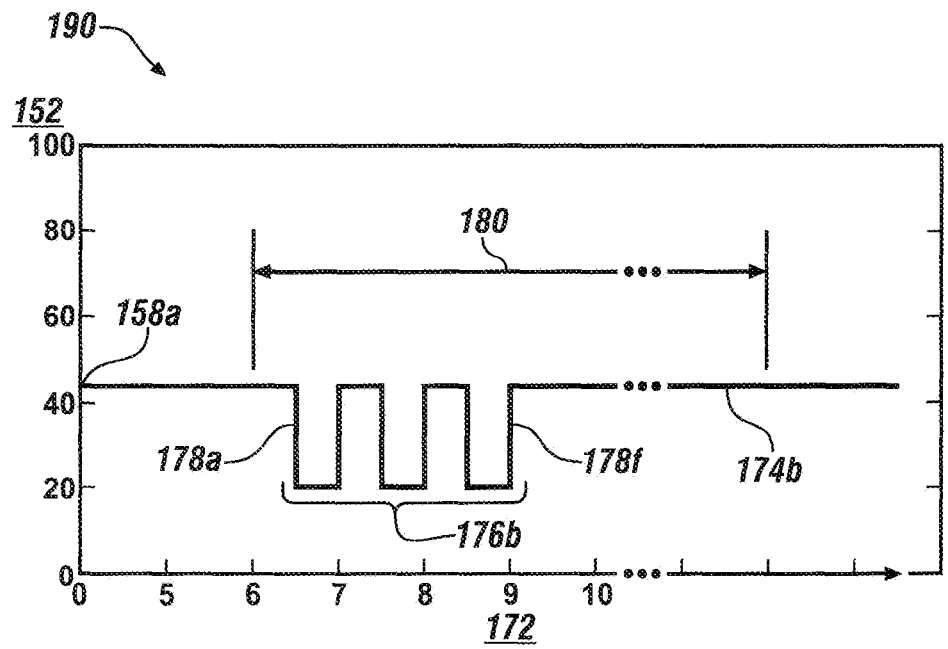
FIG. 5 is a graph of a second station pattern in accordance with one or more exemplary embodiments.

Referring to FIG. 5, a graph 190 of an example second station pattern is shown in accordance with one or more exemplary embodiments. The second station pattern illustrates three toggles down. The X axis 172 of the graph 190 shows time in units of second. The Y axis 152 of the graph 190 shows the duty cycle in units of percentage. A second pulse width modulation curve 174b illustrates the duty cycle as a function of time.

The example illustrates the duty cycle starting at the first regular duty cycle 158a of 45 percent. After an initial handshake has been established between the charging station 110 and the electric vehicle 130, the charging station 110 modifies the duty cycle in the control pilot signal in accordance with a second station pattern 176b. The second station pattern 176b includes the transitions 178a-178f between the 45 percent duty cycle and the 20 percent duty cycle within the station time limit 180. The second station pattern 176b may be distinguishable from the first station pattern 176a in the electric vehicle 130.

Figure 6:
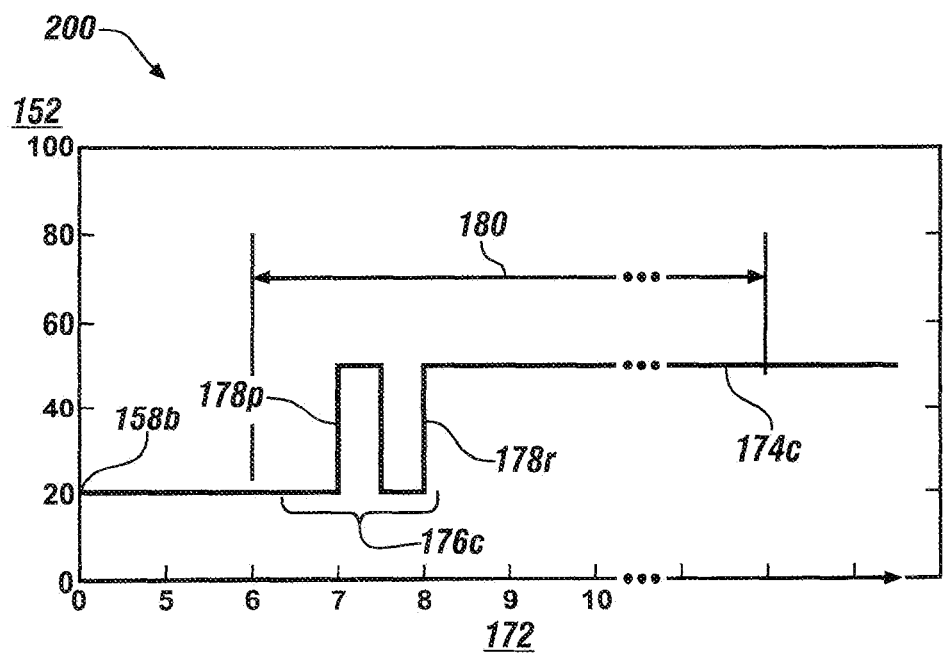
FIG. 6 is a graph of a third station pattern in accordance with one or more exemplary embodiments.

Referring to FIG. 6, a graph 200 of an example third station pattern is shown in accordance with one or more exemplary embodiments. The third station pattern illustrates one-and-a-half toggles up. The X axis 172 of the graph 200 shows time in units of second. The Y axis 152 of the graph 200 shows the duty cycle in units of percentage. A third pulse width modulation curve 174c illustrates the duty cycle as a function of time.

The example illustrates the duty cycle starting at a second regular duty cycle 158b of 20 percent. After the initial handshake has been established between the charging station 110 and the electric vehicle 130, the charging station 110 modifies the duty cycle in the control pilot signal in accordance with a third station pattern 176c. The third station pattern 176c includes the transitions 178p-178r between the 20 percent duty cycle and the 50 percent duty cycle within the station time limit 180. The third station pattern 176c may be distinguishable from the first station pattern 176a and the second station pattern 176b in the electric vehicle 130.

Figure 7:
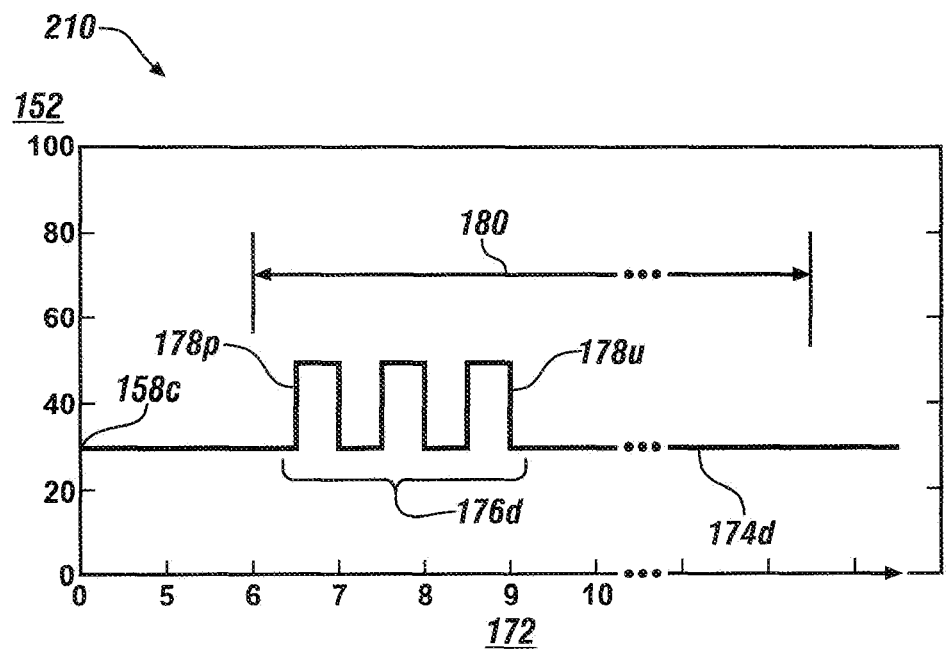
FIG. 7 is a graph of a fourth station pattern in accordance with one or more exemplary embodiments.

Referring to FIG. 7, a graph 210 of an example fourth station pattern is shown in accordance with one or more exemplary embodiments. The fourth station pattern illustrates three toggles up. The X axis 172 of the graph 210 shows time in units of second. The Y axis 152 of the graph 210 shows the duty cycle in units of percentage. A fourth pulse width modulation curve 174d illustrates the duty cycle as a function of time.

The example illustrates the duty cycle starting at a third regular duty cycle 158c of 30 percent. After the initial handshake has been established between the charging station 110 and the electric vehicle 130, the charging station 110 modifies the duty cycle in the control pilot signal in accordance with a fourth station pattern 176d. The fourth station pattern 176d includes the transitions 178p-178u between the 30 percent duty cycle and the 50 percent duty cycle within the station time limit 180. The fourth station pattern 176d may be distinguishable from the first station pattern 176a, the second station pattern 176b, and the third station pattern 176c in the electric vehicle 130.

Figure 8:
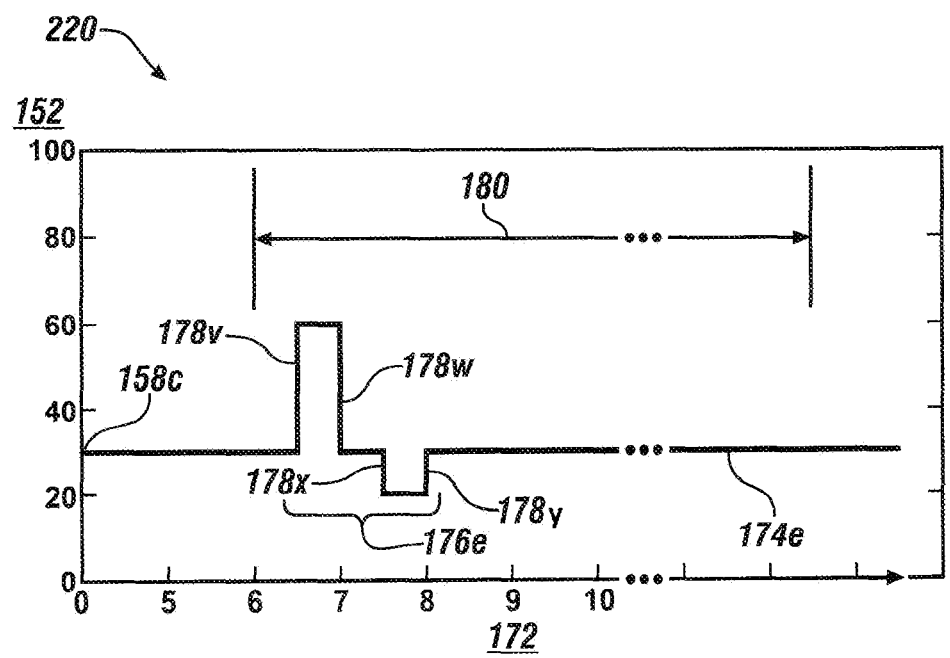
FIG. 8 is a graph of a fifth station pattern in accordance with one or more exemplary embodiments.

Referring to FIG. 8, a graph 220 of an example fifth station pattern is shown in accordance with one or more exemplary embodiments. The fifth station pattern illustrates one toggle up and one toggle down. The X axis 172 of the graph 220 shows time in units of second. The Y axis 152 of the graph 220 shows the duty cycle in units of percentage. A fifth pulse width modulation curve 174e illustrates the duty cycle as a function of time.

The example illustrates the duty cycle starting at a third regular duty cycle 158c of 30 percent. After the initial handshake has been established between the charging station 110 and the electric vehicle 130, the charging station 110 modifies the duty cycle in the control pilot signal in accordance with a fifth station pattern 176e. The fifth station pattern 176e includes the transitions 178v-178w between the 30 percent duty cycle and the 60 percent duty cycle, and the transitions 178x-178y between the 30 percent duty cycle and the 20 percent duty cycle within the station time limit 180. The fifth station pattern 176e may be distinguishable from the first station pattern 176a, the second station pattern 176b, the third station pattern 176c, and the fourth station pattern 176d in the electric vehicle 130.

Figure 9:
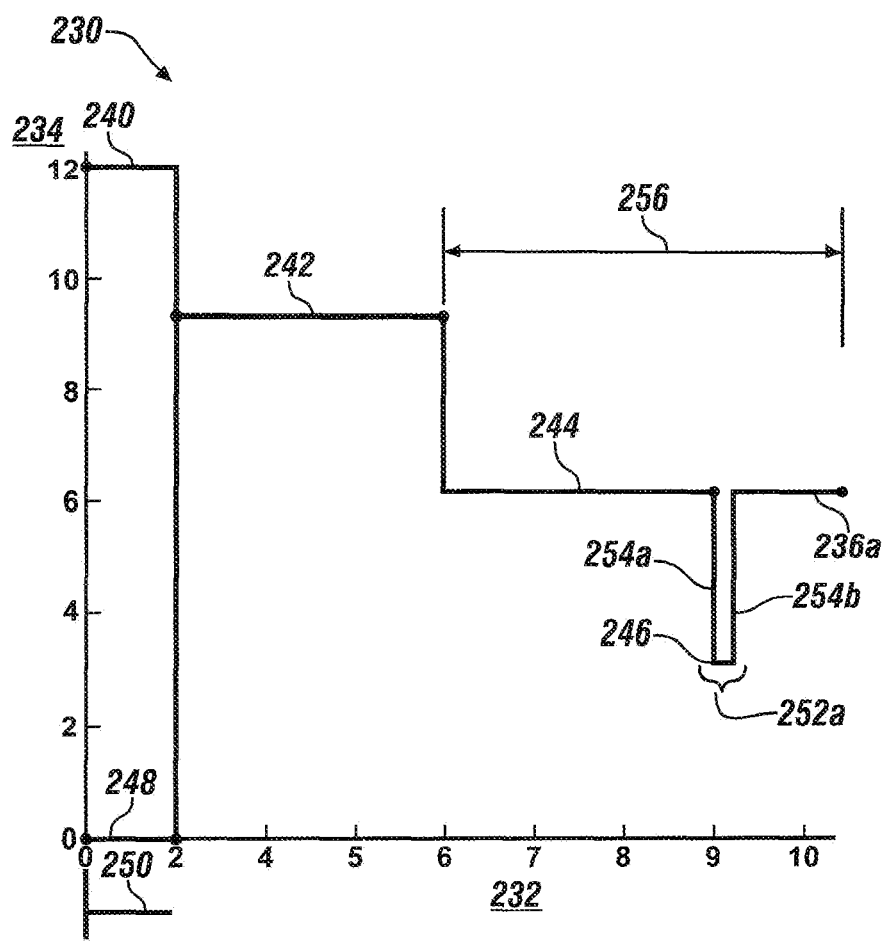
FIG. 9 is a graph of a first vehicle pattern in accordance with one or more exemplary embodiments.

Referring to FIG. 9, a graph 230 of an example first vehicle pattern is shown in accordance with one or more exemplary embodiments. The first vehicle pattern illustrates two toggles down. An X axis 232 of the graph 230 shows time in units of seconds. A Y axis 234 of the graph 230 shows the control pilot signal in units of voltage. A curve 236a illustrates the control pilot signal as a function of time.

The curve 236a generally illustrates the control pilot signal starting at the +12 volt level 240 (state A) while the plug 114 of the charging station 110 is disconnected from the socket 132 of the electric vehicle. After the plug 114 has been connected to the socket 132, the control pilot signal transitions to the +9 volt level 242 (state B). The electric vehicle 130 may pull the control pilot signal down to the +6 volt level 244 (state C) when ready for a recharge.

A time after reaching the +6 volt level 244, or during a vehicle time limit 256, the electric vehicle 130 may subject the control pilot signal to at least two transitions 254a-254b between the +6 volt level 244 (state C) and the +3 volt level 246 (state D) to signal a first vehicle pattern 252a to the charging station 110. The charging station 110 may interpret the first vehicle pattern 252a as belonging to a particular vehicle brand among many types of vehicle brands. While the first vehicle pattern 252a may involve as few as two transitions, implementing at least three transitions may reduce a probability that random noise may be interpreted as a vehicle pattern.

In the event that the control pilot signal goes to a zero volt level 248 (state E), the electric vehicle 130 and/or the charging station 110 may understand that no power is present. The control pilot signal at an out-of-range level 250 generally indicates an error condition (state F).

Figure 10:
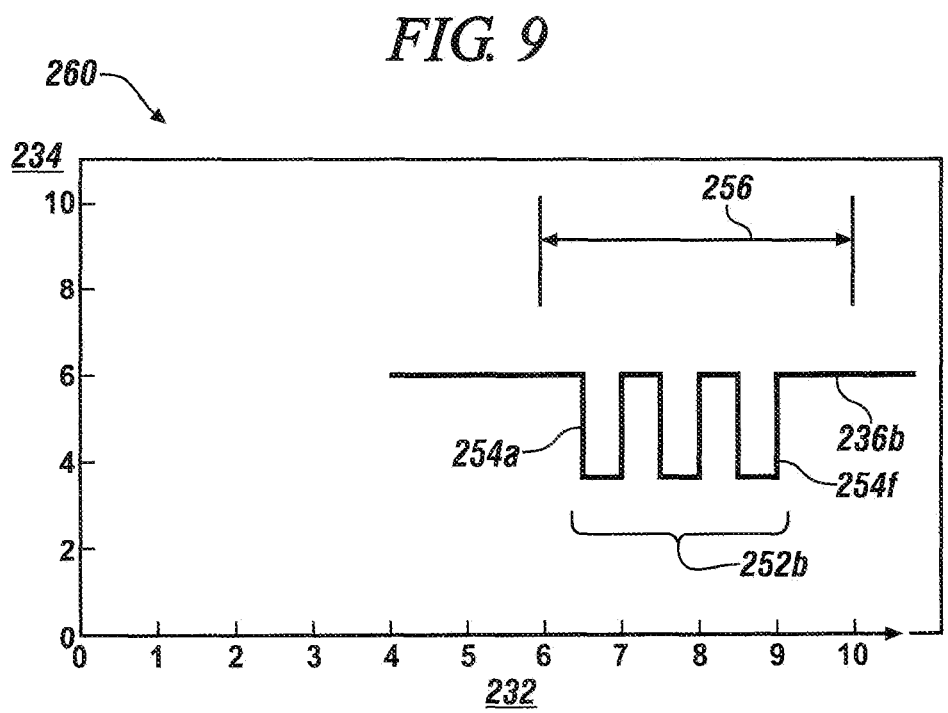
FIG. 10 is a graph of a second vehicle pattern in accordance with one or more exemplary embodiments.

Referring to FIG. 10, a graph 260 on an example second vehicle pattern is shown in accordance with one or more exemplary embodiments. The second vehicle pattern illustrates three toggles down. The X axis 232 of the graph 260 shows time in units of seconds. The Y axis 234 of the graph 260 shows the control pilot signal in units of voltage. A curve 236b illustrates the control pilot signal as a function of time.

The second vehicle pattern 252b includes several transitions 254a-254f between the +6 volt level and the +3 volt level during the vehicle time limit 256. The second vehicle pattern 252b may be distinguishable from the first vehicle pattern 252a in the charging station 110.

Figure 11:
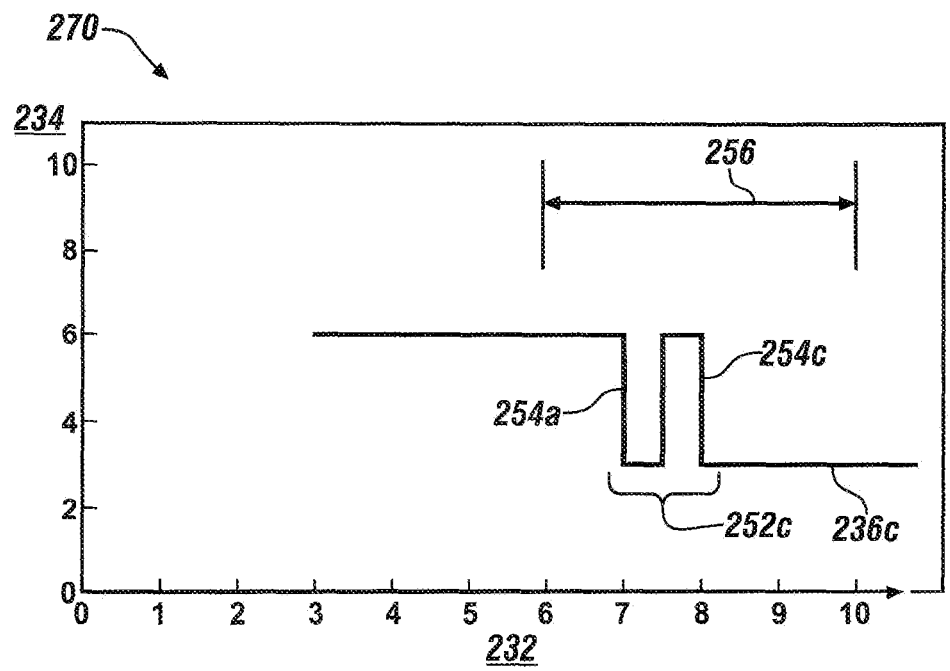
FIG. 11 is a graph of a third vehicle pattern in accordance with one or more exemplary embodiments.

Referring to FIG. 11, a graph 270 on an example third vehicle pattern is shown in accordance with one or more exemplary embodiments. The third vehicle pattern illustrates one-and-a-half toggles down. The X axis 232 of the graph 270 shows time in units of seconds. The Y axis 234 of the graph 270 shows the control pilot signal in units of voltage. A curve 236c illustrates the control pilot signal as a function of time.

The third vehicle pattern 252c includes several transitions 254a-254c between the +6 volt level and the +3 volt level during the vehicle time limit 256. The curve 236c may start at the +6 volt level and end at the +3 volt level. The third vehicle pattern 252c may be distinguishable from the first vehicle pattern 252a and the second vehicle pattern 252b in the charging station 110.

Figure 12:
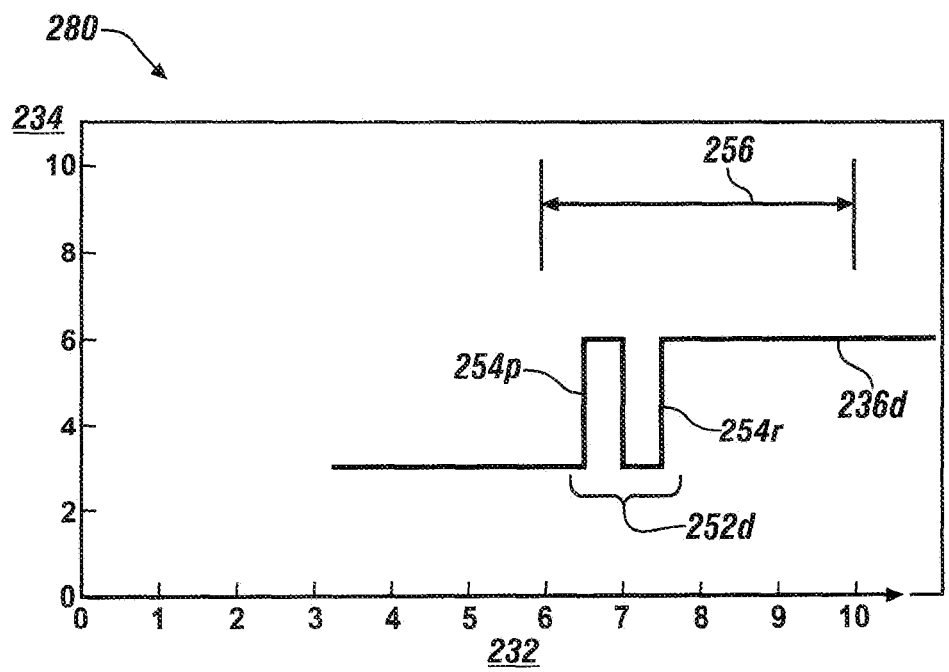
FIG. 12 is a graph of a fourth vehicle pattern in accordance with one or more exemplary embodiments.

Referring to FIG. 12, a graph 280 on an example fourth vehicle pattern is shown in accordance with one or more exemplary embodiments. The fourth vehicle pattern illustrates one-and-a-half toggles up. The X axis 232 of the graph 280 shows time in units of seconds. The Y axis 234 of the graph 280 shows the control pilot signal in units of voltage. A curve 236d illustrates the control pilot signal as a function of time.

The fourth vehicle pattern 252d includes several transitions 254p-254r between the +3 volt level and the +6 volt level during the vehicle time limit 256. The curve 236d may start at the +3 volt level and end at the +6 volt level. The fourth vehicle pattern 252d may be distinguishable from the first vehicle pattern 252a, the second vehicle pattern 252b, and the third vehicle pattern 252c in the charging station 110.

Figure 13:
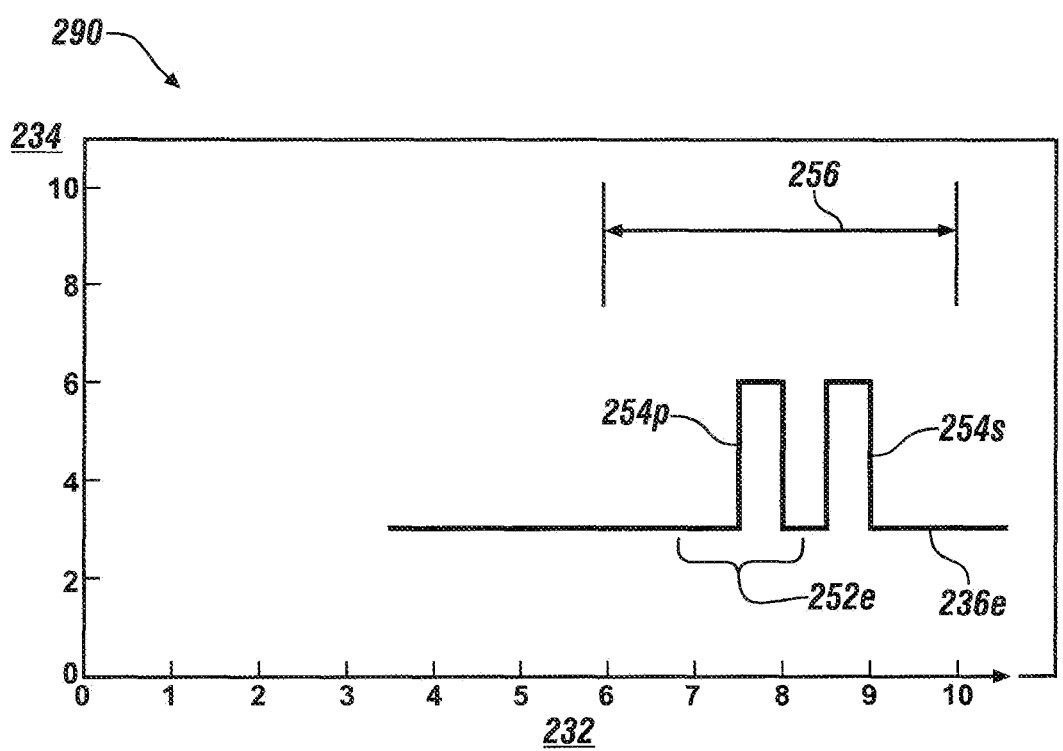
FIG. 13 is a graph of a fifth vehicle pattern in accordance with one or more exemplary embodiments.

Referring to FIG. 13, a graph 290 on an example fifth vehicle pattern is shown in accordance with one or more exemplary embodiments. The fifth vehicle pattern illustrates two toggles up. The X axis 232 of the graph 290 shows time in units of seconds. The Y axis 234 of the graph 290 shows the control pilot signal in units of voltage. A curve 236e illustrates the control pilot signal as a function of time.

The fifth vehicle pattern 252e includes several transitions 254p-254s between the +3 volt level and the +6 volt level during the vehicle time limit 256. The curve 236e may start at the +3 volt level and end at the +3 volt level. The fifth vehicle pattern 252e may be distinguishable from the first vehicle pattern 252a, the second vehicle pattern 252b, the third vehicle pattern 252c, and the fourth vehicle pattern 252d in the charging station 110.

Figure 14:
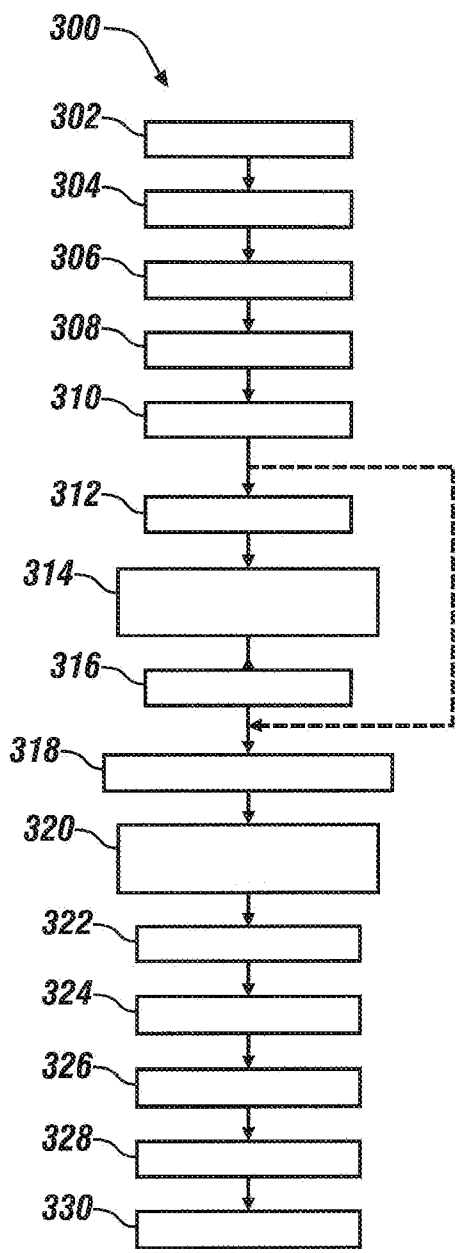
FIG. 14 is a flow diagram of a method for brand identification by an electric vehicle to a charging station in accordance with one or more exemplary embodiments.

Referring to FIG. 14, a flow diagram of an example method 300 for brand identification by an electric vehicle to a charging station is shown in accordance with one or more exemplary embodiments. The method (or process) 300 may be implemented by the system 100. The method 300 includes steps 302 to 330, as illustrated. The sequence of steps is shown as a representative example. Other step orders may be implemented to meet the criteria of a particular application.

In the step 302, the plug 114 of the charging station 110 may be connected to the socket 132 of the electric vehicle 130. The vehicle controller 134 may terminate the control pilot signal through the variable resistor (e.g., R2 in FIG. 2) in the step 304. An initial handshake may be performed in the step 306 between the charging station 110 and the electric vehicle 130 before electrical power is provided to the plug 114. In the step 308, electrical power for recharging the electric vehicle 130 may be presented to the plug 114. The electrical power at the plug 114 is received by the socket 132 in the step 310 and passed to the battery pack 138 (see FIG. 2) of the electric vehicle 130.

In various embodiments, the electric vehicle 130 may wait in the step 312 for a station pattern to be received from the charging station 110 via the control pilot signal. In the step 314, the electric vehicle 130 may detect the station pattern by sensing the changes in the duty cycle of the 1,000 hertz square wave of the control pilot signal. During the station pattern, the charging station 110 and the electric vehicle 130 may maintain an uninterrupted flow of the electrical current in the step 316. The method 300 may continue with the step 318.

In some embodiment, the electric vehicle 130 may not wait for the charging station 110 to initiate the station pattern before responding with the vehicle pattern. In such embodiments, the method 300 may transition from the step 310 directly to the step 318. In the step 318, the electric vehicle 130 may toggle the variable second resistance in a respective vehicle pattern.

The charging station 110 may detect the vehicle pattern of the electric vehicle 130 being recharged in the step 320. The charging station 110 maps the vehicle pattern just detected to a vehicle brand in the step 322. In some embodiments, the charging station 110 may distinguish the vehicle brand in the step 324 among authorized vehicle brands and unauthorized vehicle brands. In the step 326, the charging station 110 records the particular vehicle brand, and notifies the charger server computer 142a in the step 328 that another of the particular vehicle brand is being recharged. The recharging may end in the step 330.

Figure 15:
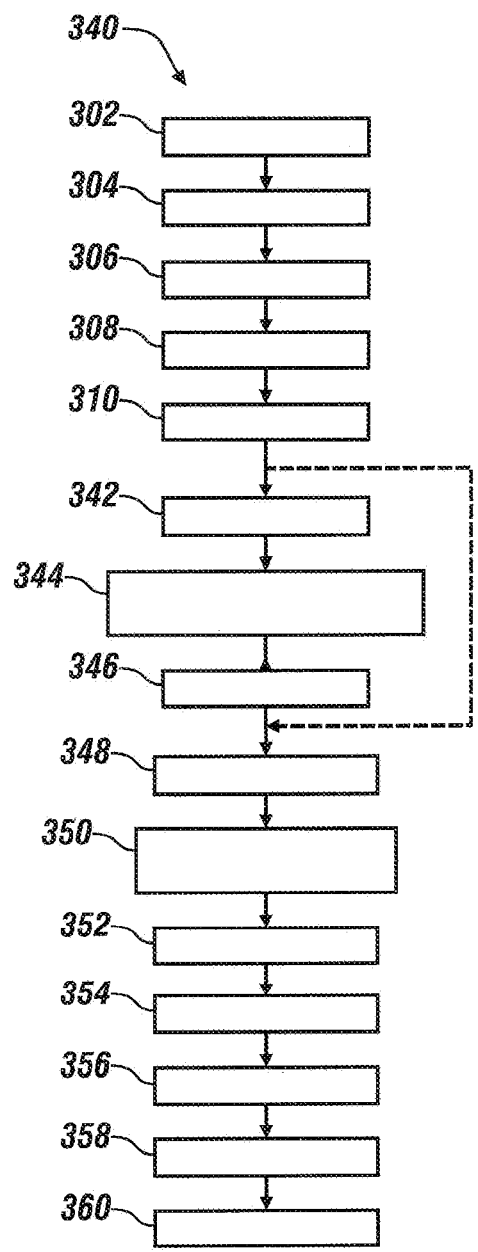
FIG. 15 is a flow diagram of a method for brand identification by a charging station to an electric vehicle in accordance with one or more exemplary embodiments.

Referring to FIG. 15, a flow diagram of an example method 340 for brand identification by a charging station to an electric vehicle is shown in accordance with one or more exemplary embodiments. The method (or process) 340 may be implemented by the system 100. The method 340 includes steps 302 to 310 and steps 342 to 360, as illustrated. The sequence of steps is shown as a representative example. Other step orders may be implemented to meet the criteria of a particular application.

In the step 302, the plug 114 of the charging station 110 may be connected to the socket 132 of the electric vehicle 130. The vehicle controller 134 may terminate the control pilot signal through the variable resistor in the step 304. An initial handshake may be performed in the step 306 between the charging station 110 and the electric vehicle 130 before electrical power is provided to the plug 114. In the step 308, electrical power for recharging the electric vehicle 130 may be presented to the plug 114. The electrical power at the plug 114 is received by the socket 132 in the step 310 and passed to the battery pack 138 (see FIG. 2) of the electric vehicle 130.

In various embodiments, the charging station 110 may wait in the step 342 for a vehicle pattern to be received from the electric vehicle 130 via the control pilot signal. In the step 344, the charging station 110 may detect the vehicle pattern by sensing the changes in the voltage of the control pilot signal caused by changes in the termination resistance in the vehicle controller 134. During the vehicle pattern, the charging station 110 and the electric vehicle 130 may maintain an uninterrupted flow of the electrical current in the step 346. The method 340 may subsequently continue with the step 348.

In some embodiment, the charging station 110 may not wait for the electric vehicle 130 to initiate the vehicle pattern before responding with the station pattern. In such embodiments, the method 340 may transition from the step 310 directly to the step 348. In the step 348, the charging station 110 may toggle the pulse width modulation of the control pilot signal in a respective station pattern. The electric vehicle 130 may detect the station pattern of the charging station 110 in the step 350. The electric vehicle 130 maps the station pattern just detected to a station brand in the step 352. In some embodiments, the electric vehicle 130 may distinguish the station brand in the step 354 among authorized station brands and unauthorized station brands. If the station brand matches one of the authorized station brands, the electric vehicle 130 marks the particular charging station 110 as a self-brand (e.g., belonging to or doing business with the same company that produced the electric vehicle 130) in the step 356, and notifies the vehicle server computer 142b in the step 358 that the electric vehicle 130 is being recharged by the authorized charging station 110. The recharging may end in the step 360.

Various embodiments of the disclosure provide branded charging stations 110 that may recognize branded electric vehicle 130, and vice versa. The recognition is accomplished utilizing and building on the current charging standards without implementing new hardware nor interfering with current methods of operation. A pilot-state toggling schema is utilized to signal unique brand identifications of the electric vehicles 130 to the charging stations 110. A pulse width modulation/duty cycle toggling schema is utilized to signal unique brand identifications of the charging stations 110 to the electric vehicles 130. The two components of the recognition may work independently, or as a requested response.

Embodiments of the system 100 determine when a branded electric vehicle 130 is recharged via an authorized charging station 110 while complying with existing charging standards. A benefit may be realized where an electric vehicle 130 and an authorized charging station 110 recognize each other. A method performed by the system 100 includes connecting a plug 114 of a charging station 110 to a socket 132 of the electric vehicle 130, generating a control pilot signal in the charging station 110, and toggling a pulse width modulation of the control pilot signal in a station pattern that transitions between two current capacity limits (e.g., a regular current capacity limit and a different current capacity limit). The control pilot signal in the plug 114 is subsequently presented to the electric vehicle 130.

The electric vehicle 130 receives the control pilot signal in the socket 132 from the charging station 110. The electric vehicle 130 is configured to detect the station pattern and map the station pattern to a station brand of the charging station 110. The electric vehicle 130 terminates the control pilot signal in a variable resistance, and toggles the variable resistance in a vehicle pattern that transitions between two charging state resistances. The charging station 110 detects the vehicle pattern, and maps the vehicle pattern to a vehicle brand of the electric vehicle 130. During the recognitions, the charging station 110 presents electrical power to recharge the electric vehicle 130 at the plug 114. The electric vehicle 130 receives receiving the electrical power at the socket 132 to recharge the electric vehicle 130. The recognition of the brands enables useful settings to aid with the recharging, customer identification recognition, and/or linking to a customer account for seamless payment at the charging stations 110.

The charger controller 116 and/or the vehicle controller 134 may be implemented as one or more processors executing software. The software may be stored in non-transitory computer readable media (e.g., nonvolatile memory). The software, when executed by the processors, may cause the processors to perform at least the method 300 for brand identification by an electric vehicle to a charging station, and the 340 for brand identification by a charging station to an electric vehicle.

Embodiments of the system 100 generally provides machines and/or methods for effectuating brand identification of the electric vehicles 130 to the charging stations 110 and vice versa. Operation of the system 100 involves connecting the plug 114 of a charging station 110 to the socket 132 of an electric vehicle 130. The charging station 110 subsequently generate a control pilot signal, and toggles a pulse width modulation of the control pilot signal in a station pattern that transitions between two current capacity limits. The control pilot signal is presented from the charging station 110 to the electric vehicle 130. The electric vehicle 130 receives the control pilot signal in the socket 132 from the charging station 110. The electric vehicle 130 is configured to detect the station pattern and map the station pattern to a station brand of the charging station 110. Therefore, the electric vehicle 130 may determine if the charging station 110 is an authorized brand or not.

The electric vehicle 130 terminates the control pilot signal in a variable resistance. The electric vehicle 130 toggles the variable resistance in a vehicle pattern that transitions between two charging state resistances. The charging station 110 detects the vehicle pattern and maps the vehicle pattern to a vehicle brand of the electric vehicle 130. Therefore, the charging station 110 may determine if the electric vehicle 130 is an authorized brand or not. The charging station 110 also presents electrical current to recharge the electric vehicle 130 at the plug 114. The electric vehicle 130 receives the electrical current for recharging at the socket 132.

All numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; about or reasonably close to the value; nearly). If the imprecision provided by "about" is not otherwise understood in the art with this ordinary meaning, then "about" as used herein indicates at least variations that may arise from ordinary methods of measuring and using such parameters. In addition, disclosure of ranges includes disclosure of all values and further divided ranges within the entire range. Each value within a range and the endpoints of a range are hereby all disclosed as separate embodiment.

While the best modes for carrying out the disclosure have been described in detail, those familiar with the art to which this disclosure relates will recognize various alternative designs and embodiments for practicing the disclosure within the scope of the appended claims.

What is claimed is:

1. A method for brand identification of an electric vehicle to a charging station comprising:
   connecting a plug of the charging station to a socket of the electric vehicle;
   receiving a control pilot signal at the socket from the charging station;
   terminating the control pilot signal in a variable resistance in the electric vehicle;
   toggling the variable resistance in a vehicle pattern that transitions between two charging state resistances, wherein the charging station detects the vehicle pattern and maps the vehicle pattern to a vehicle brand of the electric vehicle; and
   receiving electrical current to recharge the electric vehicle at the socket.

2. The method according to claim 1, wherein the vehicle pattern is at least two transitions between the two charging state resistances within a vehicle time limit.

3. The method according to claim 1, wherein the two charging state resistances are a regular charging state resistance and a ventilation charging state resistance.

4. The method according to claim 3, wherein the vehicle pattern starts at the regular charging state resistance, and the ventilation charging state resistance is a lower resistance than the regular charging state resistance.

5. The method according to claim 1, wherein a plurality of the vehicle patterns distinguishes among a plurality of vehicle brands.

6. The method according to claim 1, wherein the vehicle pattern maintains an uninterrupted flow of the electrical current from the charging station to the electric vehicle.

7. A method for brand identification of a charging station to an electric vehicle comprising:
   connecting a plug of the charging station to a socket of the electric vehicle;
   generating a control pilot signal in the charging station;
   toggling a pulse width modulation of the control pilot signal in a station pattern that transitions between two current capacity limits;
   presenting the control pilot signal in the plug to the electric vehicle, wherein the electric vehicle detects the station pattern and maps the station pattern to a station brand of the charging station; and
   presenting electrical current to recharge the electric vehicle at the plug.

8. The method according to claim 7, wherein the station pattern is at least two transitions in the pulse width modulation of the control pilot signal within a station time limit.

9. The method according to claim 7, wherein the two current capacity limits are a regular current capacity limit that the charging station may deliver to the electric vehicle and a different current capacity limit.

10. The method according to claim 9, wherein the station pattern starts at the regular current capacity limit, and the different current capacity limit is a lower current capacity limit than the regular current capacity limit.

11. The method according to claim 7, wherein a plurality of the station patterns distinguishes among a plurality of station brands.

12. The method according to claim 7, wherein the station pattern maintains an uninterrupted flow of the electrical current from the charging station to the electric vehicle.

13. A method for brand identification while recharging an electric vehicle comprising:
    connecting a plug of a charging station to a socket of the electric vehicle;
    generating a control pilot signal in the charging station;

toggling a pulse width modulation of the control pilot signal in a station pattern that transitions between two current capacity limits;

presenting the control pilot signal in the plug to the electric vehicle;

receiving the control pilot signal in the socket from the charging station, wherein the electric vehicle is configured to detect the station pattern and map the station pattern to a station brand of the charging station;

terminating the control pilot signal in a variable resistance in the electric vehicle;

toggling the variable resistance in a vehicle pattern that transitions between two charging state resistances, wherein the charging station detects the vehicle pattern and maps the vehicle pattern to a vehicle brand of the electric vehicle;

presenting electrical current to recharge the electric vehicle at the plug; and receiving the electrical current to recharge the electric vehicle at the socket.

14. The method according to claim 13, wherein the charging station initiates the toggling of the pulse width modulation in the station pattern, and the electric vehicle responds to the station pattern by the toggling of the variable resistance in the vehicle pattern.

15. The method according to claim 13, wherein the electric vehicle initiates the toggling of the variable resistance in the vehicle pattern, and the charging station responds to the vehicle pattern by the toggling of the pulse width modulation in the station pattern.

16. The method according to claim 13, further comprising:

marking the charging station as a self-brand in the electric vehicle where the station brand matches one among one or more authorized station brands.

17. The method according to claim 13, further comprising:

recording the vehicle brand in the charging station;

reporting the vehicle brand from the charging station to a charger server computer; and reporting the station brand from the electric vehicle to a vehicle server computer.

18. The method according to claim 13, wherein the toggling of the pulse width modulation occurs after an initial handshake has completed between the charging station and the electric vehicle.

19. The method according to claim 13, wherein the toggling of the variable resistance occurs after an initial handshake has completed between the charging station and the electric vehicle.

20. The method according to claim 13, wherein the control pilot signal is compliant with at least one of an SAE International J1772 standard and/or an International Electrotechnical Commission 61851-1 standard, and the two charging state resistances correspond to a state C resistance and a state D resistance.

* * * * *